Oct. 17, 1933.  J. L. CASPERSON  1,930,507
COMBINED TRACTOR AND SOIL PULVERIZER
Filed Feb. 14, 1931   3 Sheets-Sheet 1
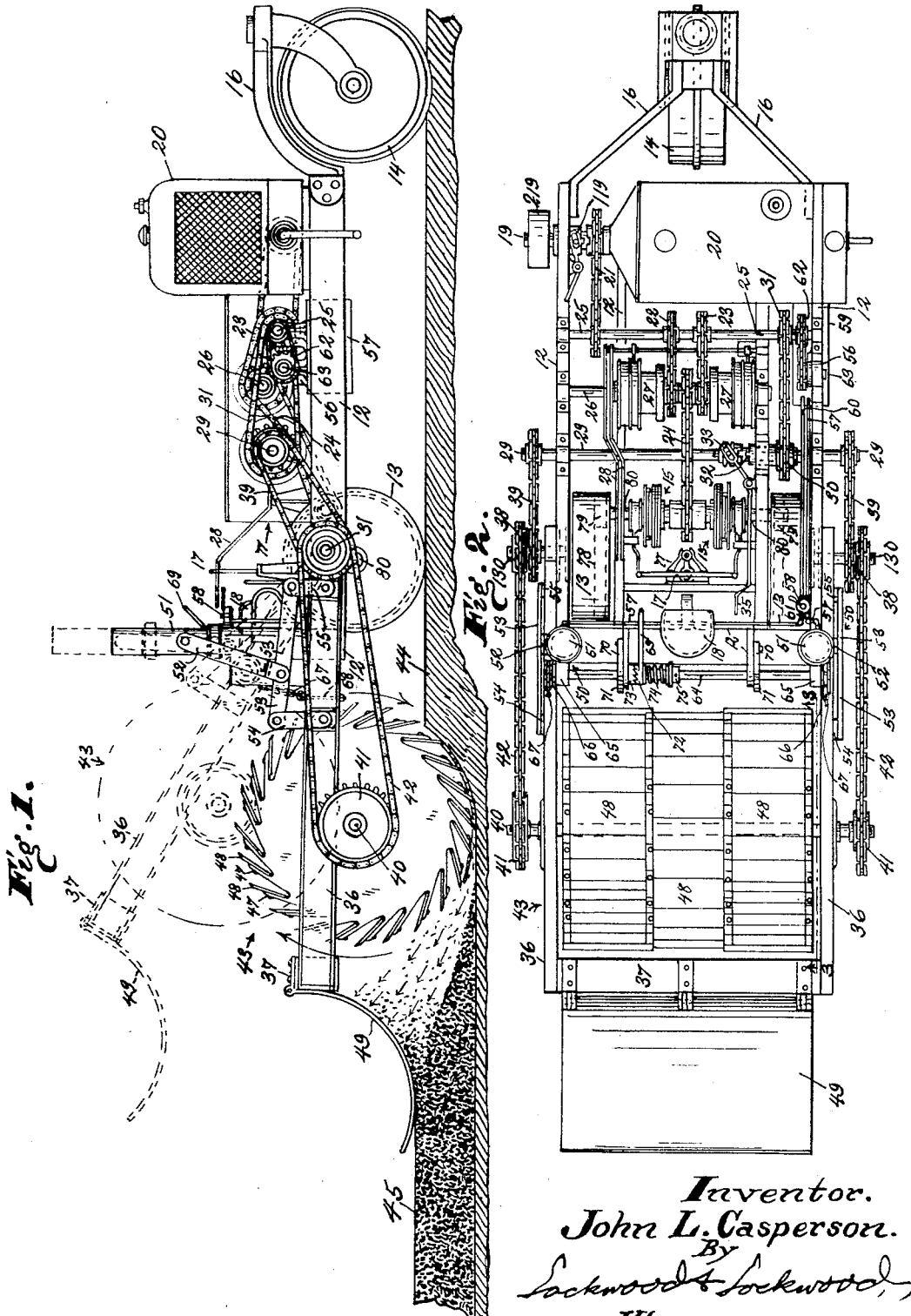
Inventor.
John L. Casperson.
By
Lockwood & Lockwood,
His Attorneys.

Oct. 17, 1933.  J. L. CASPERSON  1,930,507
COMBINED TRACTOR AND SOIL PULVERIZER
Filed Feb. 14, 1931   3 Sheets-Sheet 2
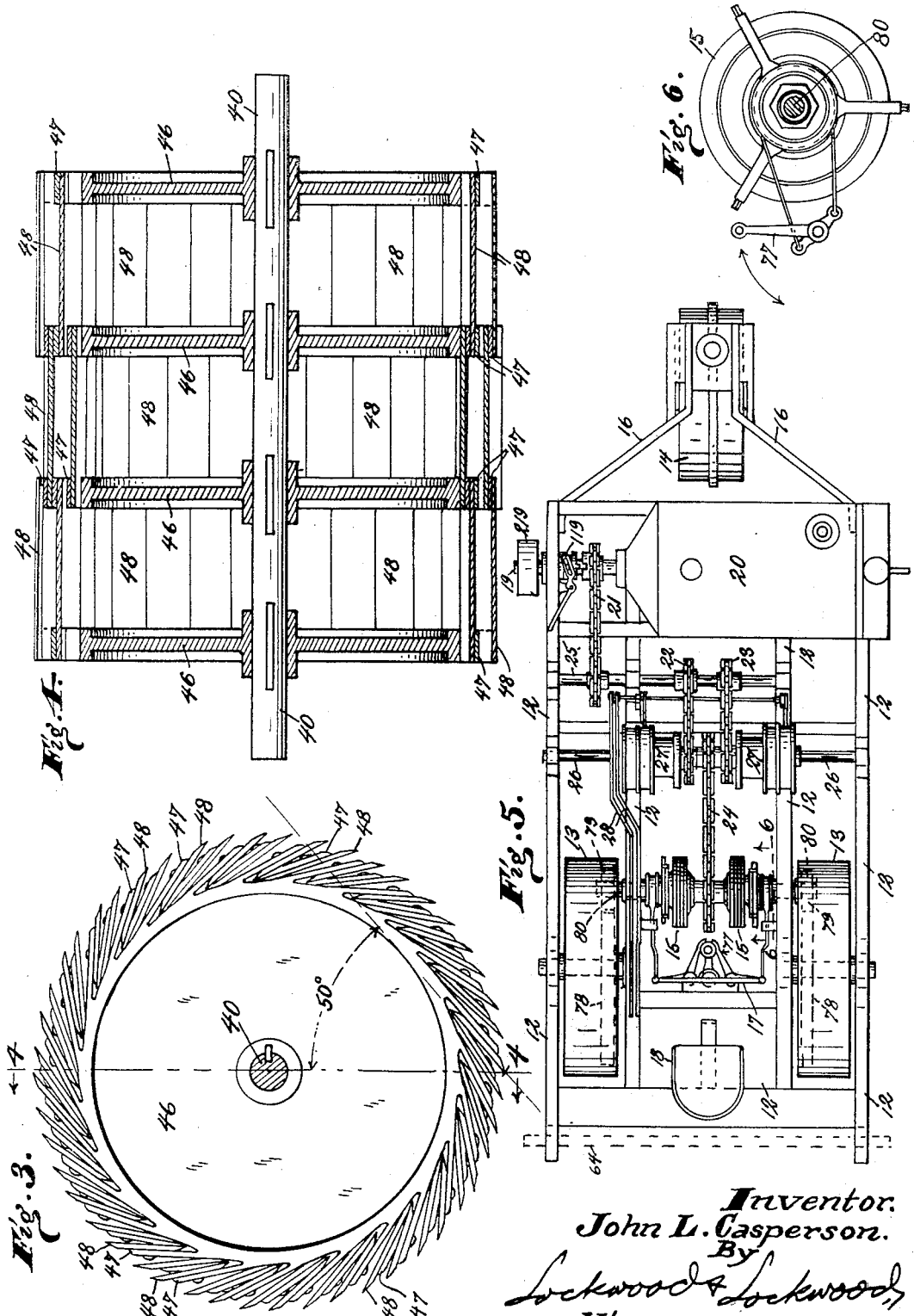

Oct. 17, 1933.                    J. L. CASPERSON                    1,930,507
                        COMBINED TRACTOR AND SOIL PULVERIZER
                              Filed Feb. 14, 1931              3 Sheets-Sheet 3
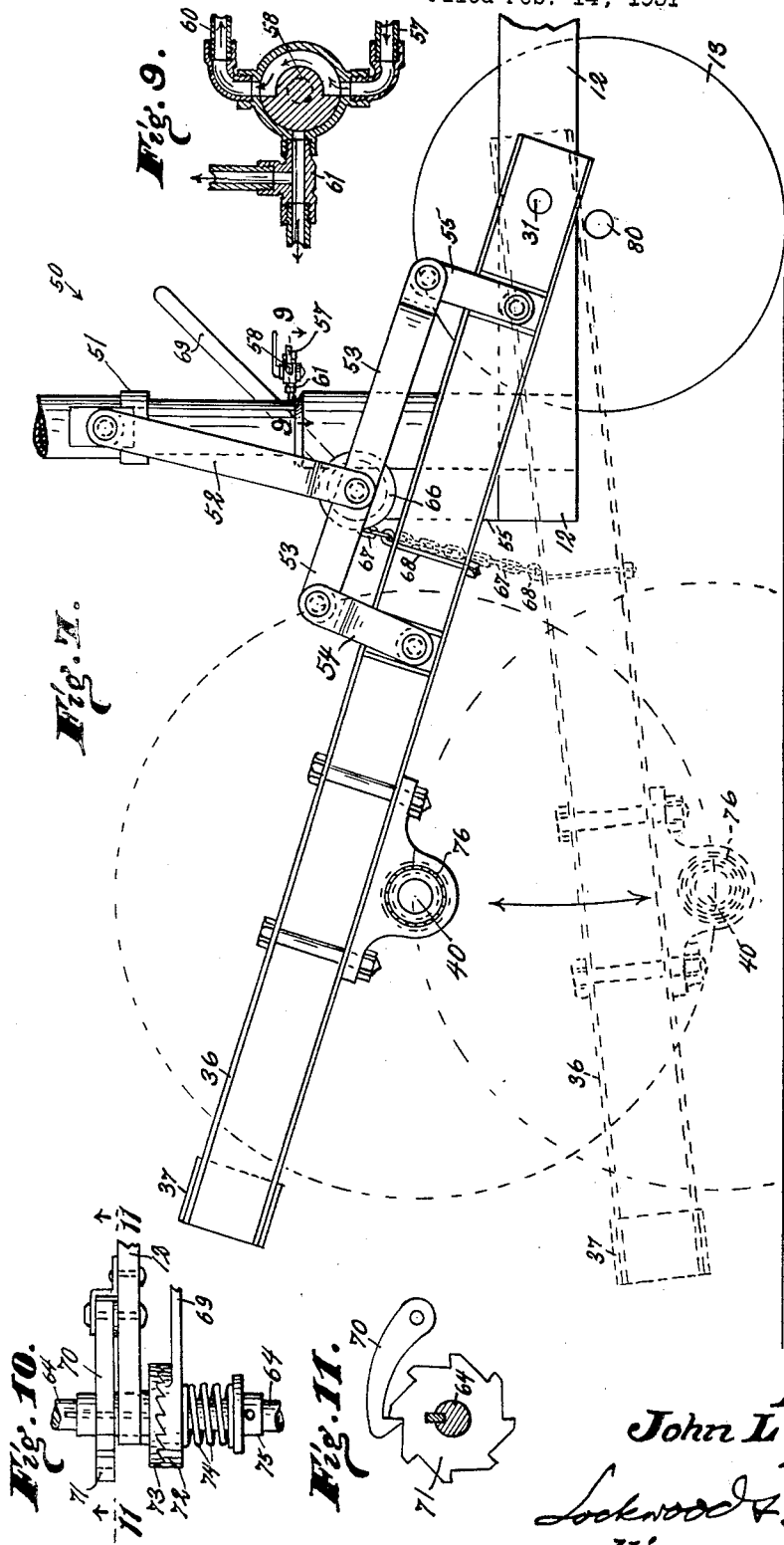
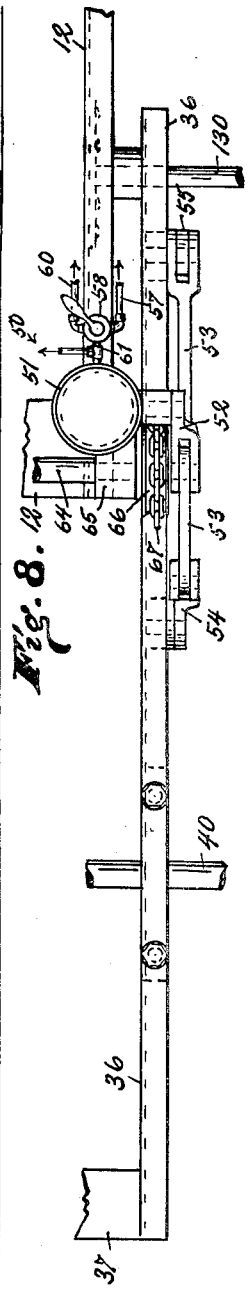
Inventor.
John L. Casperson.
By
Lockwood & Lockwood
His Attorneys Patented Oct. 17, 1933

1,930,507

UNITED STATES PATENT OFFICE 1,930,507

COMBINED TRACTOR AND SOIL PULVERIZER

John L. Casperson, Pasadena, Calif.

Application February 14, 1931. Serial No. 515,707

7 Claims. (Cl. 97—50)

Although this invention is herein termed a soil "pulverizer" for lack of a better name, it is not exactly a pulverizer or a plow as those names have been generally used. In a sense it does the work of both a plow and a pulverizer, but unlike either. Its work on the soil is in principle like that of a hoe, which digs into the soil and throws it back. Here a cylinder is provided on its periphery with a large number of closely associated flat tangential and transversely extending cutter plates, which might be called hoe plates, and the cylinder is drawn behind a tractor or other vehicle frame and forcibly rotated at a faster speed than the tractor is driven and independently of the tractor drive so that the series of hoe plates on it will, like a hoe, dig into the hard soil and cut it into exceedingly thin slices and throw it rearwardly as a layer of sliced dirt.

Another object of the invention is to provide a soil pulverizer that will thoroughly disintegrate the soil and leave it in a soft level bed free of clods and tracks ready for planting. To that end I provide a pulverizer adjustable to cut the soil uniformly to any desired cultivating depth and to the full width of the tractor; and also I drive the cutter plates at a much greater speed than the forward travel of the tractor, so that the blades slice the soil into thin sheets that are thrown rearwardly preferably against a trailing spreader plate, the impact of which breaks the slices into powdery pieces and causes them to shower down and form an even mellow bed of soil for seeding.

Another object is to provide a soil pulverizer that can be suspended above the ground when idle and moving from place to place; and also when so suspended the tractor can be backed into the corners of rectangular fields to pulverize the ground for planting. In other words the land in rectangular fields can be prepared for planting up to the fence line and corner in a manner heretofore not accomplished by large cultivators or breaking plows.

Features of invention are shown in the construction, combination and arrangement of parts whereby a pulverizer for the soil is provided which, in addition to pulverizing the soil to any desired depth for seed planting, can also be used for shaving the ground to destroy weeds or for cutting away uneven places on roads, parks or play-grounds that require leveling. In other words the cutter blades can be driven at high speed while the tractor is standing still or moving at a snail's pace so that the apparatus can be used to shave off hard ridges in roadways or the like.

Features of invention are shown in the construction of the cutter blades and their arrangement on the rotary supports, whereby they stand in a near vertical position when first contacting with the top surface of the soil. In other words the blades are arranged tangentially on the cutter wheels so they are turned into a vertical position in their arc movement around the axis of the pulverizer and contact their cutting edges with the top surface of the soil when in a nearly vertical position.

A feature of invention is shown in placing the blades in three units, side by side, with the blades of the center unit staggered relative to the blades of the end units to cause a separation of the slices before they are thrown against the spreader to disintegrate them into powdery pieces.

Other objects, advantages and features of invention may appear from the accompanying drawings, the subjoined detailed description and the appended claims.

The accompanying drawings illustrate the invention.

Figure 1 is a side view of a combined tractor and soil cultivator that is constructed in accordance with this invention, parts indicated diagrammatically, showing the rotator of the pulverizer in position to displace the soil to a depth usually cut by a breaking plow, and by dotted lines indicating the rotator in an elevated position.

Fig. 2 is a plan view of the apparatus shown in Fig. 1, parts indicated diagrammatically and showing the center cutting blades of the pulverizer staggered relative to the end blades.

Fig. 3 is an enlarged section on line 3—3, Fig. 2, showing an end view of the pulverizer and blades, parts omitted; also showing the tangential angle of the blades relative to the periphery of the rotator.

Fig. 4 is a section on line 4—4, Fig. 3, showing the detailed construction of the pulverizer.

Fig. 5 is a plan view of the tractor stripped of the pulverizer parts showing that the tractor can be used for other purposes than pulling and driving the soil pulverizer.

Fig. 6 is an enlarged cross section on line 6—6, Fig. 5, showing an end view of the clutch for controlling the starting and stopping, as well as directing the travel of the tractor.

Fig. 7 is a semi-diagrammatic side view of the frame and adjustable support of the pulverizer, parts omitted for the sake of clearness in the drawings.

Fig. 8 is a fragmental plan view of the frame, parts shown in Fig. 7 showing the mounting of the rack bar and shieve wheel thereon by means of which, and the adjustable supporting chains, the frame can be manually lifted or limited in its downward movement.

Fig. 9 is a fragmental cross section on line 9—9, Fig. 7, showing the three-way valve that controls the flow of oil to the hydraulic hoisting cylinders.

Fig. 10 shows an enlarged fragmental plan view of the means for manually operating the ratchet shaft to raise or lower the pulverizer frame to adjust the depth to which the cutters will be driven, parts omitted.

Fig. 11 is a cross section on line 11—11, Fig. 10, showing one of the ratchet wheels and pawls for holding the pulverizer in adjusted position.

The combined tractor and soil pulverizer includes a frame 12 supported on drive wheels 13 and a front caster wheel 14.

The drive wheels are at the sides and adjacent the rear end of the frame with a clutch mechanism 15 between them that permits the wheels to be driven together or independently of one another, and the caster wheel is supported centrally and in advance of the frame on an extension frame 16 so it is guided in travel by a manual manipulation of the drive wheels through the clutch mechanism 15 and hand control that is adjacent the driver's seat.

In other words when the right drive wheel is retarded in travel the caster wheel will be moved by the left drive wheel to turn the vehicle to the right, and when the right drive wheel is stopped the left drive wheel will turn the vehicle in a circle with the right wheel as a pivot and a reverse turning of the vehicle will occur when the left drive wheel is retarded or stopped.

It is well known that the foregoing means for guiding and turning the vehicle is old in the art and for that reason is not shown or described in full detail.

The clutch mechanism is in driving connection with the shaft 19 of the engine 20 by the chains 21, 22 and 23 and 24, it being understood that these chains are mounted on suitable sprocket wheels not numbered or shown in detail.

The chains 22 and 23 connect sprocket wheels on the driven shaft 25 with the sprocket wheels on the shaft 26 that extend through the speed change box 27 with mechanism arranged therein to give the vehicle the usual four speeds of high, low, intermediate and reverse.

Control levers 28 extend from the change speed box 27 rearwardly toward the driver's seat where they are accessible for manipulation. This change speed mechanism and control are also old in the art and are not shown or described in detail. They are diagrammatically indicated for the purpose of clearly inicating the operation of the apparatus.

Also supported on the frame 12 is a shaft 29 on which there is an idle sprocket wheel 30 that is connected by a drive chain 31 to a sprocket wheel on the shaft 25. The hub of the sprocket wheel 30 is extended through a bearing 32 and forms the idle member of the clutch 33 keyed to the shaft 29. This clutch is manipulated by a lever 35 extending toward the seat 27. When the clutch is closed and the engine is driven the shaft 29 will be rotated.

Spindles 130 are oppositely arranged on and secured to the frame 12 so that they form pivots for the hoist beams 36 extending rearwardly of the frame that are connected by a tie beam 37. Twin sprocket wheels 38 are rotatably mounted in the spindles and a member of each is connected by chains 39 to sprocket wheels on the ends of shaft 29.

A shaft 40 is supported in roller bearings 76 secured under and adjacent the outer ends of the hoist beams 36, and secured to the ends of this shaft are sprocket wheels 41 that are connected by chains 42 to the other members of the twin sprockets 38.

Secured to the shaft 40 is a rotary cylindrical soil pulverizer 43 that can be driven by the engine 20 to cut or dig and throw back the soil 44 and evenly distribute it in a soft seed bed 45, as illustrated in Fig. 1.

The cylindrical pulverizer 43 includes four disks 46 secured on shaft 40 and laterally spaced apart, and the disks 46 have tangentially projecting arms or flanges 47 on their peripheries to which are secured a series of flat soil cutting blades or hoe plates 48.

The cutters or hoe plates 48 are arranged at a tangential angle of about fifty degrees, as illustrated in Fig. 3, so that when the cutting edges of the plates engage the top surfaces of the ground the engaged plates are almost perpendicular to the soil and cut into instead of scraping it. Also the center disks are preferably staggered relative to the outside plates so that the slices cut by the plates do not extend entirely across the pulverizer but are in three strips of equal width.

The plates 48 are provided with two cutting edges so they can be turned over when an edge becomes dull; and also they are made of very hard metal so they can be used for a very long time before an edge will become dull and need be turned.

The pulverizer can be rotated at a much greater speed than the vehicle so that the cutter blades can slice the soil into very thin sheets that readily break up in a powdery mass when thrown against the trailing spreader 49 that is hinged to the tie beam 37.

In other words when the pulverizer is in use the blades slice the ground and throw it rearwardly against the under side of the spreader 49 where it falls back to earth to form the seed bed 45 shown in Fig. 1. When the soil is thus pulverized it is ready for seeding.

The pulverizer 43 is raised and lowered by the hydraulic lift 50 that is supported on the frame 12 above and rearward of the drive wheels 13. This hydraulic lift is old and will not be described in detail except to show its connection to the pulverizer. It includes a cylindrical hoist 51 at each side of the vehicle, each hoist having a stationary and a movable member.

The movable members of the hydraulic hoist 51 are pivotally connected to their respective hoist beams 36 by draw bars 52 that are pivotally connected to the toggle levers 53, 54, that are pivotally connected to the beams 36, so that when the hydraulic hoist is actuated the beams 36 will be moved to either raise or lower the pulverizer 43.

The hydraulic hoist is actuated to lift the pulverizer by oil pressure driven by the pump 56 through pipe 57 to the hydraulic cylinders. A three-way valve 58 is interposed between the pump and cylinders, as best illustrated in Figs. 2, 7 and 9.

When the valve 58 is in the position shown in Fig. 9 the oil will be circulated through the valve and back to the tank 59 over the return pipe 60. When the valve 58 is in a position to connect the pipe 57 with 61 the hydraulic lift will be actuated to lift the pulverizer. When the valve 58 connects the pipe 61 with the pipe 60 the oil will discharge from the hydraulic cylinders and return to the tank 59 and consequently lower the pulverizer.

The pump 56 is driven by chain 62 that extends over suitable sprocket wheels on the pump shaft 63 and drive shaft 25.

An adjustable stop is provided for limiting the downward movement of the pulverizer. This stop includes a shaft 64 journaled through the bearings 65 extended upward from the frame 12, and secured to the ends of the shaft are shieve wheels 66.

Chains 67 have one of their ends secured to their respective wheels 66 and are then coiled on the wheels and extended down to the eye bolts 68 secured to the beams 36. When the chains are wound on or off the wheels the position of the beams 36 will be changed to adjustably raise or lower the pulverizer.

The wheels 66 are rotated for adjustment of the pulverizer by a ratchet lever 69 on the shaft 64, and are held from rotation or in adjusted position by pawls 70 that engage the ratchet wheels 71, as best illustrated in Figs. 10 and 11.

The lever 69 has a hub portion 72 loosely mounted on the shaft 64 that has a clutch face that is normally held engaged with the clutch face of a wheel 73 that is keyed to a hub extension of the ratchet wheel 71 so that the wheels turn together.

The clutch faces of the hub 72 and wheel 73 are held engaged by a spring 74 that is interposed between the collars 75 and hub 72.

Preferably the shaft 40 is mounted in ball-bearings 76, as diagrammatically indicated in Fig. 7; and also the shafts 25, 26, 29 and twin sprockets 38 are mounted in ball bearings so that there is relatively small frictional resistance for the engine to overcome in driving the apparatus. As ball bearings are old in the art no attempt has been made to show the mounting of the foregoing rotary parts in full detail.

In operation the engine through the connection heretofore described actuates the clutch mechanism 15 which, through the manually operated control 77, can be in a neutral position in which neither of the driving wheels is actuated or so they are both actuated; or also either of them actuated independently of the other to move the tractor horizontally over the ground and independently of the pulverizer.

The wheels 13 have internal gear teeth 78 that are engaged by gears 79 on the clutch shafts 80 so that when the clutches are actuated and the clutch members engaged the wheels 13 will be driven either forward or backward according to the setting of the gears in the speed change boxes 27.

With the chain stops 67 properly adjusted to limit the downward movement of the pulverizer, as hereinbefore described, the apparatus can be driven to pulverize a very large area of land in a working day and leave it in a soft mellow bed ready to seed, and the bed will be free of clods, uneven places or track marks of the tractor. When the land has been pulverized the pulverizer can be removed from the tractor so that the latter can be used for other purposes.

The shaft 19 is provided with a clutch 119 and pulley 219 so the latter can be used to drive a belt without actuating the other mechanism of the apparatus.

The tractor and pulverizer can be actuated independently of one another, there being a direct drive from the engine to each so that the tractor can be run backwards while the pulverizer is actuated to shave or pulverize the soil.

It is obvious that when the pulverizer is suspended that the tractor can be reversely driven to back the pulverizer up into the corners of rectangular fields to start pulverizing the ground at the fence line so that substantially all the land can be prepared for planting.

This feature of the invention is of great use as heretofore ordinary breaking plows have been employed to break the ground near the fence lines and in the corners of the fields near and into which large gang plows heretofore employed could not be driven.

The special drive employed with my tractor and the mounting of my pulverizer enables me to reach any point in a field in which the soil is to be displaced.

What I claim as my invention is:

1. A combined tractor and soil pulverizer including a vehicle frame, a pair of hoist beams pivotally connected to the sides of said frame adjacent its rear end and extended rearwardly thereof, a rotary soil pulverizer mounted on said beams, a hydraulic hoist supported on said frame, a toggle lever and draw bar connection between said hoist and beams that is operated by said hoist to move said pulverizer toward or from the ground, a rotary stop for limiting the downward movement of said beams to adjust said pulverizer and maintain it in a position to cut a predetermined depth into the ground, and an engine on said frame for driving said tractor forward at a relatively slow speed and also driving rotary pulverizer at a high speed.

2. A combined tractor and soil pulverizer including a vehicle frame, spindles secured to said frame adjacent its rear end, a pair of hoist beams pivotally connected to said spindles that are extended rearwardly therefrom, a rotary soil pulverizer mounted on said beams, a hydraulic hoist supported on said frame, a toggle lever and draw bar connection between said hoist and hoist beams that is operated by said hoist to move said pulverizer toward or from the ground, a ratchet wheel stop for limiting the downward movement of said beams to adjust said pulverizer and maintain it in a position to cut a predetermined depth into the ground, and an engine on said frame for driving said tractor forward or backward at a high, intermediate or low speed and also driving said rotary pulverizer at a high speed.

3. In a combined tractor and soil pulverizer the combination with a frame, drive wheels supporting said frame, a rotary pulverizer, hoist beams pivotally connected to said frame for supporting said pulverizer rearwardly thereof, an engine on said frame, a driving connection between said engine and said drive wheels and pulverizer arranged to rotate said pulverizer at a greater speed than said drive wheels, a hydraulic hoist on said frame that can be operated to raise and lower said beams, of a stop shaft supported on said frame, shieve wheels on the ends of said shaft, chains connecting said shieve wheels and beams, ratchet wheels on said shaft, pawls for holding said shaft from rotation when engaged with said ratchet wheels, and a ratchet lever for rotating said shaft for the purpose specified.

4. In a combined tractor and soil pulverizer the combination with a tractor having an engine for driving it, of a soil pulverizer suspended rearwardly thereof, said pulverizer including a shaft, spaced disks secured thereto, extensions to the peripheral edges of said disks, with spaced cutter blades secured to said extensions, a hydraulic hoist for moving said pulverizer toward or from the ground, means for operating said hoist, a driving connection between said pulverizer and engine that can be operated independently of the driving connection between said tractor and engine, and an adjustable rotatably controlled stop for limiting the movement of said pulverizer toward the ground, said stop adapted to be operated to raise said pulverizer independently of said hydraulic lift.

5. In a combined tractor and soil pulverizer the combination with a tractor having a pair of drive wheels adapted to be operated together or separately to drive said tractor forward or backward at various speeds, an engine for driving said wheels, a hydraulic hoist, a fluid pump operated by said engine for actuating said hoist, of a rotary pulverizer, hoist beams to which said pulverizer is pivotally connected, and a toggle lever and draw bar connection between said hoist and beams whereby said pulverizer can be raised or lowered.

6. In a combined tractor and soil pulverizer the combination with a tractor having a frame, a pair of drive wheels adapted to be operated together or separately to drive said tractor forward or backward at variable speeds, an engine for driving said wheels, a hydraulic hoist, a fluid pump operated by said engine for actuating said hoist, of a pair of parallel hoist beams having their forward ends pivotally connected to the rear end of said frame, a rotary pulverizer pivotally connected to said beams, toggle lever and draw bar connections from said beams to said hoist whereby said pulverizer can be raised or lowered, and a high speed driving connection between said engine and pulverizer, and adjustable stop means for limiting the distance to which said pulverizer can be raised or lowered.

7. In a combined tractor and soil pulverizer the combination with a tractor having a main frame, drive wheels supporting the rear end of said frame, an engine on said frame, a driving connection from said engine to said wheels whereby they can be driven together or separately to drive said tractor forward or backward, a hydraulic hoist on said frame, a fluid pump in operative connection with said hoist, a three-way valve for controlling the flow of fluid between said pump and hoist, of a rotary pulverizer, parallel hoist beams to which said pulverizer is pivotally connected, a pivotal connection between the forward ends of said beams and frame, and toggle lever and draw bar connection between said hoist and beams for the purpose specified.

JOHN L. CASPERSON.